May 9, 1967
A. P. RUTH
3,318,324
AIR REPLENISHING DEVICE FOR AIR PRESSURE
OPERATED WATER SUPPLY SYSTEM
Filed March 25, 1964
2 Sheets-Sheet 2
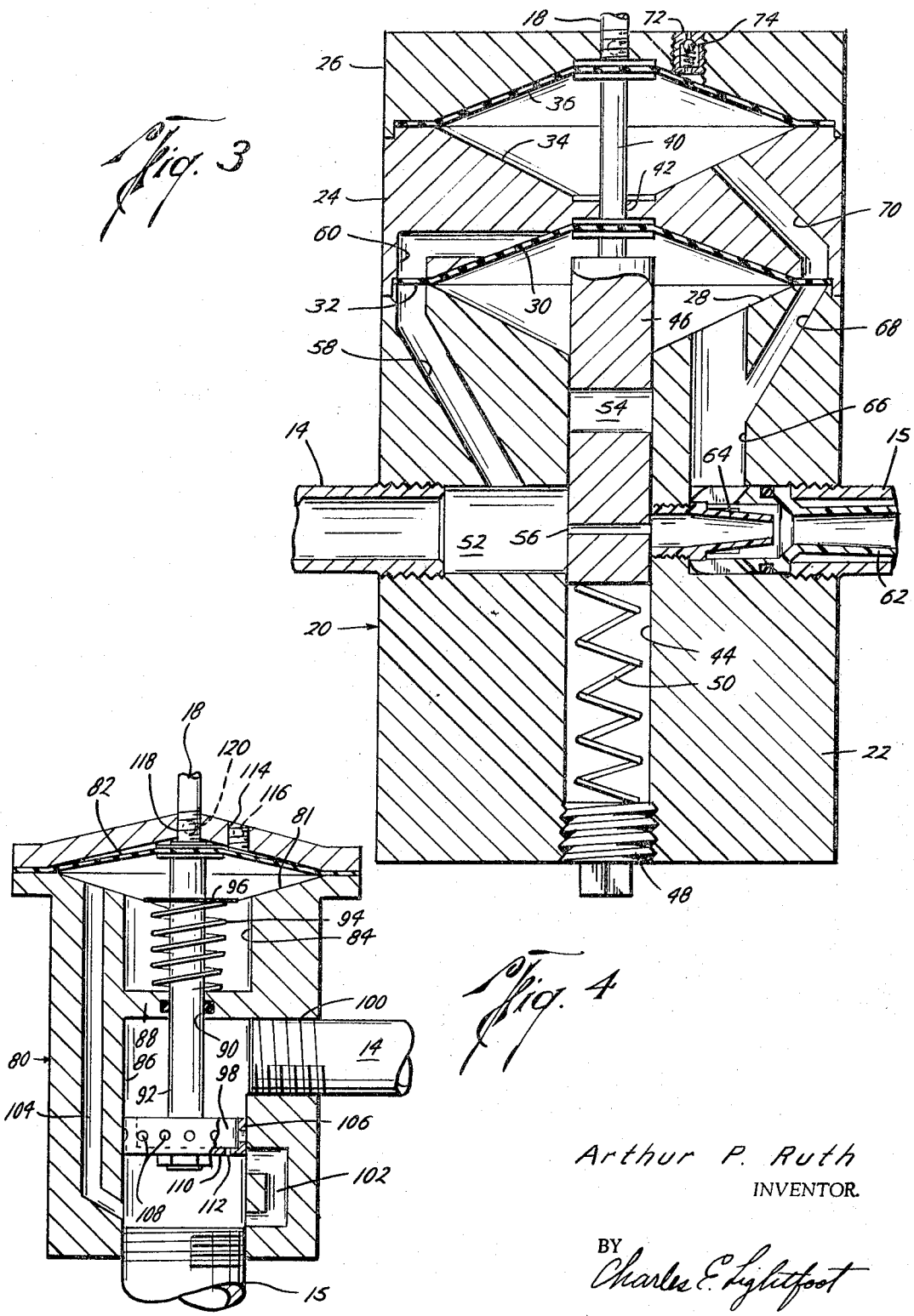
Arthur P. Ruth
INVENTOR.
BY
Charles E. Lightfoot
ATTORNEY

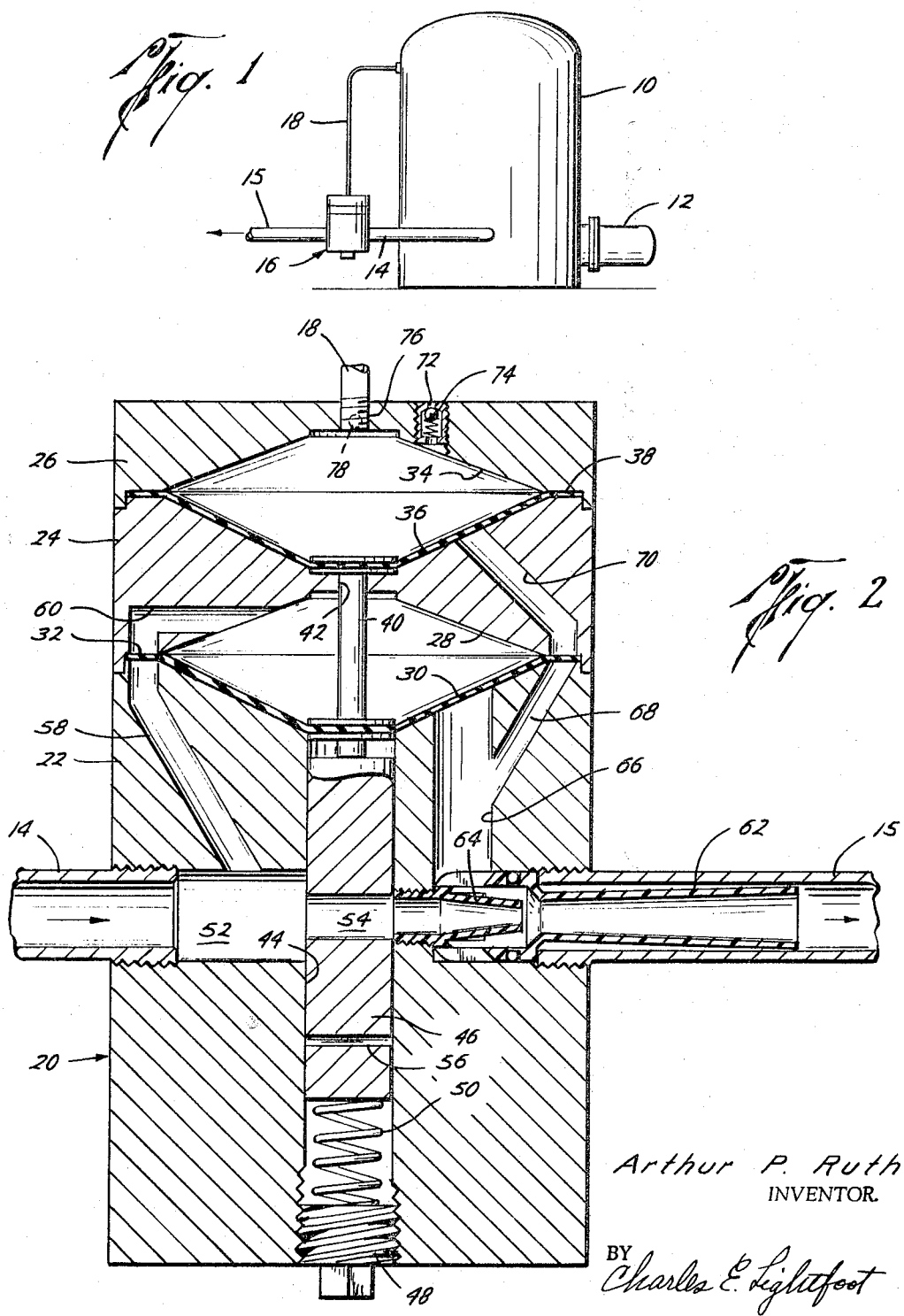

United States Patent Office 3,318,324
Patented May 9, 1967

3,318,324
AIR REPLENISHING DEVICE FOR AIR PRESSURE OPERATED WATER SUPPLY SYSTEM
Arthur P. Ruth, 5025 Jensen Drive,
Houston, Tex. 77026
Filed Mar. 25, 1964, Ser. No. 354,527
2 Claims. (Cl. 137—209)

This invention relates to air pressure operated water supply systems and more particularly to mechanism for automatically replenishing the air in such a system.

The invention is capable of wide application in connection with water supply systems in which the flow of water from the system takes place under the influence of the pressure of air entrapped in a supply tank above the water therein, and finds particular utility in household or domestic water supply systems of this type in which the air under pressure is in contact with the water in the supply tank.

In water supply systems of the kind mentioned, as commonly constructed, water is pumped into a supply tank at a lower level therein, so that as the water rises in the tank the air above is compressed for use in effecting an outflow of water from the tank for use in the system. Due to the large area of the interface between the air and water in such a system the air above the water is gradually dissolved in the water, which often results in depletion of the air to the extent that the system no longer operates efficiently.

The present invention has for an important object the provision of means in a water supply system of the kind referred to by which air is automatically supplied to the tank to replenish the same in response to operation of the system, each time the outflow of water is started and stopped.

Another object of the invention is to provide air replenishing mechanism for pressure operated water supply systems which is of simple design and rugged construction, which is easily installed in existing systems and by which the supply of air in the tank is replenished as the water from the tank is used.

The above and other important objects and advantages of the invention will be apparent from the following detailed description, constituting a specification of the same, when considered in conjunction with the annexed drawings, wherein:

FIGURE 1 is a side elevational view, on a reduced scale, illustrating a water supply system of the type in connection with which the invention is adapted for use, showing the air replenishing device connected into the system;

FIGURE 2 is a vertical, central, cross-sectional view, on an enlarged scale, of a preferred embodiment of the air replenisher of the invention, in one position of the operation of the same;

FIGURE 3 is a view similar to that of FIGURE 2 showing the air replenisher in another position of operation; and FIGURE 4 is a vertical, central, cross-sectional view of a somewhat modified form of the air replenisher of the invention.

Referring now to the drawings in greater detail the air replenisher of the invention is illustrated herein in connection with its use in a water supply system of a conventional type, such as that shown in FIGURE 1, having a pressure tank 10, into which water is pumped at a lower level, as by means of a pump 12 of the usual kind and from which water may flow to any desired location, through an outlet pipe 14, under the influence of the pressure of the air entrapped in the tank above the level of the water therein. The air replenishing device of the invention generally designated 16 is connected to the outflow pipe 14 and has an outlet pipe 15 from which water may flow from the tank to any desired location. The air replenisher also has an air discharge pipe 18 which leads to the interior of the supply tank 10.

The embodiment of the invention illustrated in FIGURES 2 and 3 comprises a casing, generally designated 20, which in the present instance is formed in three sections 22, 24 and 26 shaped to be fitted together and adapted to be secured together in any suitable manner, as by means of bolts, or the like, not shown.

The sections 22 and 24 are shaped to form between them when assembled, a cavity or chamber 28, across which a flexible diaphragm 30 extends, the marginal portion 32 of the diaphragm being clamped between the sections about the periphery thereof.

The sections 24 and 26 are likewise shaped to form between them when assembled a second diaphragm chamber 34, similarly provided with a flexible diaphragm 36 whose marginal portion 38 is clamped between the sections about the periphery of the diaphragm. The diaphragms 30 and 36 are connected together at their centers by a shaft 40 which is slidably extended through a central opening 42 in the section 24 into the chambers 28 and 34 to cause the diaphragms to flex together in the same direction.

The section 22 has a central bore 44 within which a valve plunger 46 is slidably positioned which plunger forms a continuation of the shaft 40 and which moves longitudinally therewith. The bore 44 is closed at the lower end of the casing 20 by a screw plug 48 against which one end of a coil spring 50 bears, which spring bears at its other end against the lower end of the plunger 46 to yieldingly urge the plunger upwardly in the bore.

The section 22 also has a flowway 52 therethrough, which intersects the bore 44 and which is connected at one end to the outflow pipe 14 and at its other end to the outlet pipe 15. The plunger 46 has a passageway 54 therethrough through which water may flow through the flowway 52 from the tank to the pipe 15 when the plunger is in the position of FIGURE 2 and which is closed when the plunger is in the position of FIGURE 3. The plunger 46 may also have a small pressure equalizing passageway 56 through which fluid in the flowway 52 may flow when the plunger is in the position of FIGURE 3, and which is closed when the plunger is in the position of FIGURE 2.

Communicating passageways 58 and 60 are provided in the sections 22 and 24 through which fluid may flow from the inlet end of flowway 52 into chamber 28 above the diaphragm 30.

A Venturi tube 62 is fitted into the outlet portion of the flowway 52 which tube discharges into the pipe 15, and a nozzle 64 is disposed in the outlet portion of the flowway in position to discharge fluid into the inlet end of the Venturi tube.

The section 22 has a passageway 66 which is in communication at one end with the interior of the Venturi tube and whose other end opens into the chamber 34 beneath the diaphragm 30 whereby the pressure in the chamber 34 beneath the diaphragm 30 will be reduced when water is discharged through the nozzle 64 through the Venturi tube.

The sections 22 and 24 also have communicating passageways 68 and 70 leading from the passageway 66 to the interior of the chamber 34 beneath the diaphragm 36 whereby the pressure in the chamber beneath the diaphragm will be reduced when the Venturi tube is in operation.

The section 26 has an inlet opening 72 through which air from the exterior may enter the chamber 34 above the diaphragm 36, and which is provided with a check valve 74 which closes to prevent the outflow of air from the chamber 34 through the opening. The section 26 also has an outlet opening 76 into which the pipe 18 is connected to allow the outflow of air from the chamber 34 into the tank 10 upon upward flexing of the diaphragm 36, and which outlet is provided with a check valve 78 which closes to prevent the back flow of air from the tank 10 into chamber 34 through the pipe 18.

In the operation of the system, the plunger 46 of the air replenisher will be in the position shown in FIGURE 3, when no water is being withdrawn from the system. Upon an outflow of water from the system, such as would take place upon the opening of a spigot or water faucet in the system, water will flow out of pipe 15 while water under pressure will be supplied through pipe 14 to the inlet portion of the flowway 52, thus causing a reduction in the pressure in the chambers 28 and 34 beneath the diaphragms 30 and 36 by the outflow of water from the chambers through passageways 68 and 70 and passageway 66, while water under pressure is supplied to the chamber 28 above diaphragm 30 through passageways 58 and 60, whereupon the diaphragms will be flexed downwardly to the position of FIGURE 2 to move plunger 46 downwardly against the pressure of the spring 50 to open the flowway through opening 54. Upon such downward movement of the diaphragm 36, air will be drawn into chamber 34 above the diaphragm through the opening 72. During the continuance of the outflow of water from the system the plunger 46 will be held in the position of FIGURE 2 against the upward pressure of spring 50, by the suction in chambers 28 and 34 beneath the diaphragms produced by the outflow of water through the Venturi tube 62. As soon as the outflow of water from the system is turned off, as by the closing of the faucet the suction produced by the Venturi tube 62 will be immediately cut off allowing the spring 50 to move the plunger 46 upwardly to flex the diaphragms 30 and 36 upwardly, whereupon air in the chamber 34 above diaphragm 36 will be forced out of the chamber through pipe 18 into the tank 10. When the valve plunger 46 has moved to closed position any difference in pressure between the inlet and outlet portions of the flowway 52 may be equalized through the small passageway 56. Thus, upon each opening and subsequent closing of a faucet of the system a charge of air is supplied to the tank 10 to replenish any loss of air therefrom.

A somewhat different form of the air replenisher of the invention is illustrated in FIGURE 4 wherein the parts are shown in the positions which they occupy when the faucets of the system are closed and no outflow from the system is taking place. In this form of the invention the replenisher has a casing generally designated 80, having an upper diaphragm chamber 81, somewhat similar to the chamber 34 of the form of the invention illustrated in FIGURES 2 and 3, provided with a diaphragm 82 similar to the diaphragm 36 and similarly held in place. The casing 80 has a centrally disposed counterbore 84 opening into the chamber 81 and beneath which the casing has a bore 86, separated from the counterbore by an internal wall 88 having a central opening 90, through which a shaft 92 is slidably extended. Within the counterbore 84 a coil spring 94 surrounds the shaft 92 which spring bears at one end against the bottom of the counterbore and is secured at its other end to the shaft, as by means of a washer 96 fixedly secured to the shaft to cause the spring to yieldingly urge the shaft upwardly. The shaft 92 is connected at its upper end to the diaphragm 82, centrally thereof and at its lower end to a piston 98 slidably disposed in the bore 86. The casing 80 has an opening 100 in communication with the bore 86 at the upper end thereof and into which the pipe 14 is connected. The casing 80 also has a by-pass passageway 102 which communicates at its opposite ends with the interior of the bore at longitudinally spaced locations below the opening 100, and a passageway 104 which opens at one end into the bore 86 at a location below the upper end of the passageway 102 and whose other end opens into the chamber 81 beneath the diaphragm 82.

The piston 98 is of generally cup shape open at the top and provided with a peripheral wall 106 having perforations 108 therethrough. The bottom wall 110 of the piston may have a small pressure equalizer port 112 therethrough.

The casing 80 has an inlet opening 114 leading from the exterior into the chamber 81 above the diaphragm 82 in which opening a check valve 116 is located to allow inflow of air into the chamber through the opening and to prevent the outflow of air therethrough. An outlet opening 118 is also provided in the casing through which air may flow out of the chamber 81 above diaphragm 82, and in which a check valve 120 is located to prevent backflow of air from the tank 10 into chamber 81.

In the operation of the form of the invention illustrated in FIGURE 4, the piston 98 will be in the position shown when no outflow of water from the system is taking place, thus closing the bore 86 against the outflow of water from pipe 14 to pipe 15. When a faucet of the system is opened the pressure on the downstream side of piston 98 will be reduced, while the pressure in the tank 10 will be applied to the upstream side of the piston through pipe 14 to move the piston downwardly in the bore 86 against the upward pressure of the spring 94. Meanwhile the pressure in the chamber 81 beneath diaphragm 82 will be reduced through passageway 104 so that the diaphragm will move downwardly to draw air into chamber 81 above the diaphragm through opening 114.

As soon as the piston has been thus moved to a position in which the perforations 108 are in communication with passageway 102 through the upper end of the passageway, water may flow from the bore 86 through passageway 102 and out through pipe 15. The pressure of the water on the upstream side of the piston will continue to hold the piston in its valve open position as long as the outflow from the system continues. When the faucet of the system is turned off and outflow from the system ceases, however, the pressure in the bore on opposite sides of the piston will be equalized through the passageway 102, whereupon the spring 94 will move the diaphragm 82 upwardly to force air out of chamber 81 through pipe 118 into the tank 10. Thus, each time that a faucet of the system is opened and subsequently closed a charge of air will be supplied to the tank 10 to replenish any air lost therefrom.

Any difference in pressure in the bore on opposite sides of the piston which may occur after the piston has moved to its valve closed position will be equalized through the small port 112.

It will thus be seen that the invention constructed and operated as described above provides an air replenisher for pressure operated water supply systems which is of economical manufacture, easily installed, and which is certain in operation.

The invention is disclosed herein in connection with certain specific embodiments of the same, which it will be understood are intended to be illustrative only, and the device is capable of various modifications within the spirit of the invention and the scope of the appended claims.

Having thus clearly shown and described the invention, what is claimed as new and desired to secure by Letters Patent is:

1. In a water supply system the combination with a tank provided with an outlet pipe through which water may flow under the pressure exerted by air compressed in the tank above the water therein due to a rise in the level of water in the tank, of means for replenishing the air in the tank comprising a casing having a flowway therethrough through which water may flow from the tank and a bore intersecting the flowway, plunger means slidably disposed in the bore for longitudinal movement therein into and out of a position to open the flowway, said casing having a first internal chamber into which the bore opens at one end and into which the plunger means is extended and a second internal chamber spaced from said first chamber, a first flexible diaphragm extending across said first chamber, and a second flexible diaphragm extending across said second chamber, said plunger means being connected to the diaphragm in said first chamber, said casing having an opening from said first chamber into said second chamber and means slidably extended through said opening and connecting said diaphragms to cause the diaphragms to flex together, means for allowing an inflow of air into said second chamber on one side of the second diaphragm upon flexing of said second diaphragm in response to movement of the plunger means into flowway opening position and to causing an outflow of air from the second chamber on said one side of the second diaphragm into said tank in response to movement of said plunger means out of flowway opening position, said casing having a passageway opening into the flowway upstream of said bore and leading into said first chamber on one side of said first diaphragm to apply the pressure of water from the tank to said first diaphragm to urge the first diaphragm in a direction to move the plunger means into flowway opening position and passageways in communication with said flowway downstream of said bore and leading into said chambers at locations to cause flexing of the diaphragms in a direction to move the plunger means into flowway opening position upon the outflow of water through the flowway, and means for moving the plunger means out of flowway opening position upon cessation of such outflow of water through the flowway.

2. The air replenishing means for a water supply system in accordance with claim 1, including passageway means in said plunger positioned for coaction with said passageways to allow equalization of the pressure on the opposite sides of said first diaphragm upon movement of said plunger to flowway closing position.

References Cited by the Examiner
UNITED STATES PATENTS

| | | | |
|---|---|---|---|
| 1,950,121 | 3/1934 | McKee | 137—502 X |
| 2,435,053 | 1/1948 | Piccardo | 103—6 |
| 2,447,173 | 8/1948 | Gordon. | |
| 2,578,050 | 12/1951 | Deters | 103—6 X |

ALAN COHAN, *Primary Examiner.*